United States Patent
Garcia et al.

(10) Patent No.: US 6,834,715 B2
(45) Date of Patent: Dec. 28, 2004

(54) APPARATUS FOR COOLING A BATTERY IN AN OUTDOOR EQUIPMENT CABINET

(76) Inventors: Marvin P. Garcia, 316 Glenwood Dr. #101, Bloomingdale, IL (US) 60108; Michael R. Cosley, 1665 Flagstone Dr., Crystal Lake, IL (US) 60014

(*) Notice: Subject to any disclaimer, the term of this patent is extended or adjusted under 35 U.S.C. 154(b) by 0 days.

(21) Appl. No.: 10/338,341

(22) Filed: Jan. 8, 2003

(65) Prior Publication Data

US 2003/0094263 A1 May 22, 2003

Related U.S. Application Data

(62) Division of application No. 09/567,528, filed on May 9, 2000, now Pat. No. 6,533,031.

(51) Int. Cl.[7] ............................. F25B 29/00; F25D 23/12
(52) U.S. Cl. ......................... 165/263; 165/47; 62/259.2
(58) Field of Search ................................. 165/263, 264, 165/47, 48.1, 53, 54, 55, 56, 57, 58, 59; 62/3.2, 3.6, 60, 259.2, 236

(56) References Cited

U.S. PATENT DOCUMENTS

| | | | |
|---|---|---|---|
| 4,215,307 A | | 7/1980 | Channing et al. |
| 4,274,262 A | * | 6/1981 | Reed et al. |
| 4,297,850 A | | 11/1981 | Reed |
| 4,314,008 A | | 2/1982 | Blake et al. |
| 4,812,733 A | * | 3/1989 | Tobey |
| 4,823,554 A | * | 4/1989 | Trachtenberg et al. |
| 4,999,576 A | * | 3/1991 | Levinson |
| 5,035,964 A | | 7/1991 | Levinson et al. |
| 5,187,030 A | * | 2/1993 | Firmin et al. |
| 5,197,291 A | * | 3/1993 | Levinson ...................... 62/3.2 |
| 5,229,702 A | | 7/1993 | Boehling et al. |
| 5,262,587 A | | 11/1993 | Moser |
| 5,338,624 A | | 8/1994 | Gruenstern et al. |
| 5,456,164 A | | 10/1995 | Bang |
| 5,492,779 A | | 2/1996 | Ronning |
| 5,646,825 A | * | 7/1997 | Huttenlocher et al. |
| 5,655,381 A | | 8/1997 | Huttenlocher |
| 5,737,923 A | * | 4/1998 | Gilley et al. |
| 5,871,859 A | * | 2/1999 | Parise |
| 5,934,079 A | | 8/1999 | Han et al. |
| 5,954,127 A | | 9/1999 | Crysler et al. |
| 6,010,800 A | * | 1/2000 | Stadnick et al. |

FOREIGN PATENT DOCUMENTS

DE          3526842          2/1986

OTHER PUBLICATIONS

M.J. Maronglu et al.; "Thermal Management of Battery Compartments of Outdoor Telecommunication Cabinets Using Phase Change Materials" INTELEC '97, Oct. 19–23, 1997, NY, IEEE, pp. 29–34.

* cited by examiner

Primary Examiner—Ljiljana Ciric
(74) Attorney, Agent, or Firm—Harness, Dickey & Pierce, P.L.C.

(57) ABSTRACT

An equipment cabinet mounted on a concrete pad. The cabinet includes an upper equipment chamber, a lower back-up battery chamber and a heat exchanger. Ambient air is drawn across batteries in the lower chamber before being drawn into the heat exchanger to help cool electronic components in the upper chamber. Air in the upper chamber is separate circulated through the heat exchanger. A cold plate is placed beneath the batteries and is connected to a refrigeration system. A heating pad is located below the cold plate and is separated from the concrete pad by insulation. The cold plate and the heating pad are used to maintain the batteries at about 25° C. regardless of ambient temperatures so as to extend the useful lives of the batteries.

14 Claims, 5 Drawing Sheets ly housed
in an outdoor cabinet, particularly in active systems, is
APPARATUS FOR COOLING A BATTERY IN AN OUTDOOR EQUIPMENT CABINET This is a divisional application of commonly-owned U.S. patent application Ser. No. 09/567,528, filed May 9, 2000 now U.S. Pat. No. 6,533,031.

BACKGROUND OF THE INVENTION

1. Field of the Invention

The present invention relates generally to extending the life of back-up batteries used in an outdoor equipment cabinet and, more particularly, to a novel battery cooling system which maintains the temperature of back-up batteries at an ideal level despite temperature extremes imposed by ambient conditions.

2. Description of the Related Art

Many forms of electronic equipment, of necessity, must be located in an outdoor environment. Such equipment in typical form may be telecommunications and cable television equipment including active electronic and optical systems and passive cross-connect and splicing fields. It is essential that such equipment be protected from a wide range of ambient temperatures and inclement climatic conditions such as rain, snow, sleet, high winds and sand storms as well as other in situ environmental issues like seismic vibration, etc. To this end, cabinet enclosures have been developed to house such electronic equipment in a highly weather tight manner.

The type of electronic equipment that is typically housed in an outdoor cabinet, particularly in active systems, is known to generate considerable amounts of heat in operation. Further, in many environments the ambient air can become very warm and heat up the air internal to the cabinet. Many active systems enclosed in outdoor equipment cabinets employ battery back-up means to ensure reliable performance. Often the batteries are of a lead-acid construction which is known to be adversely affected by temperature extremes in terms of battery life. In fact, a standard lead-acid battery performs optimally at a temperature of about 25° C., as opposed to more elevated temperatures which can reach as high as 65° C. in some outdoor environments. At 25° C. battery life is about 10 years. However, for every 10° C. increase battery life is cut in half. Temperature fluctuations also are detrimental to battery life.

Systems are known for cooling batteries for outdoor equipment cabinets exposed to relatively high ambient temperatures. For example, Han et al., U.S. Pat. No. 5,934,079, teach a cabinet wherein back-up batteries are disposed underneath a heat sink through which air circulates at a regulated temperature utilizing forced convection heat transfer. Other known convection systems includes the CHAMPION THERMOSAFE cooling system, a thermoelectric device having a very low coefficient of performance. A Zome Work COOL CELL cooling system uses a water thermosyphon. Another company buries the batteries underground but this also has many drawbacks including the need for additional equipment.

Another drawback to existing systems is that they may be stand alone units instead of being integrated with the equipment cabinet.

It is important to develop a system which does not expose batteries to high temperatures or substantial temperature variations if long life for the battery is an objective. For commercial purposes, such a system must be reliable, efficient and reasonably priced.

BRIEF SUMMARY OF THE INVENTION

Accordingly, it is an object of the present invention to provide a battery cooling system for back-up batteries used for outdoor equipment cabinets wherein the batteries are consistently maintained at a predetermined constant temperature (or within a very small temperature range), and preferably a temperature on the order of 25° C. Another advantage of the present invention is to provide such a battery cooling system which is incorporated in an outdoor equipment cabinet of known design without major redesign of the cabinet. Still further, an aim of the present invention is to provide such a system which is readily manufacturable and cost-effective to produce. Another object of the present invention is to extend battery life. Yet another advantage of the present invention is that it is highly reliable.

The present invention improves over the prior art by providing an apparatus for extending the useful life of a lead-acid type battery by applying conductive cooling directly to the bottom surface of the battery to maintain a constant temperature of about 25° C. regardless of the ambient temperature surrounding the battery.

A more complete understanding of the present invention and other objects, aspects, aims and advantages thereof will be gained from a consideration of the following description of the preferred embodiments read in conjunction with the accompanying drawings provided herein.

DETAILED DESCRIPTION OF THE PREFERRED EMBODIMENTS

Figure 1:
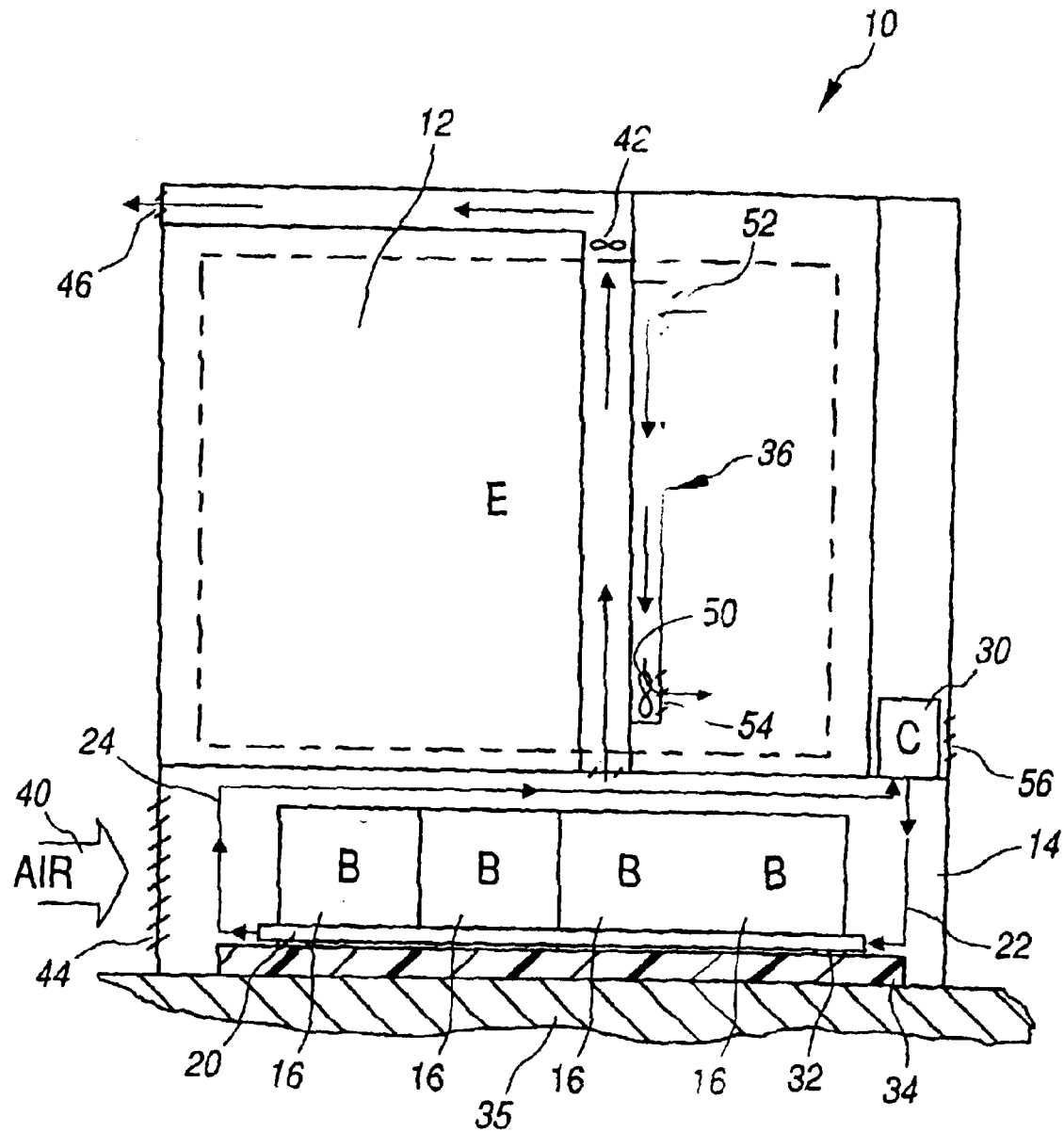
FIG. 1 is a schematic elevation view of an outdoor equipment cabinet employing a back-up battery cooling and heating system.

While the present invention is open to various modifications and alternative constructions, the preferred embodiments shown in the drawings will be described herein in detail. It is understood, however, that there is no intention to limit the invention to the particular forms disclosed. On the contrary, the intention is to cover all modifications, equivalent structures and methods and alternative constructions falling within the spirit and scope of the invention as expressed in the appended claims.

Referring now to the drawing, FIG. 1 illustrates in schematic form an outdoor equipment cabinet designated generally by the reference numeral 10 which is designed to enclose active communications equipment such as banks of printed circuit boards. The cabinet is divided into an equipment chamber 12 and a battery chamber 14. A bank of back-up batteries 16, typically of the lead-acid type, are disposed in the separate battery chamber 14. In accordance with the invention, a flat cold plate 20 is disposed beneath the batteries but in direct contact therewith. The cold plate 20, sometimes also referred to as an evaporator, is connected by suitable conduits 22 and 24 to a refrigeration system 30 which is designed to circulate a refrigerant through the cold plate 20 to achieve a predetermined temperature.

Located beneath the cold plate 20 is a heating pad 32. Once again, there is direct contact between the heating pad and the cold plate. Direct contact means that heat transfer will occur through conduction and not convection. That is, a cooled cold plate will engender heat flow from the batteries to the cold plate under warm ambient conditions. The same is true under cold ambient conditions. Heat from the heating pad will transfer by conduction to the cold plate and in turn be transferred to the batteries by conduction.

The main objective here is to efficiently and effectively maintain the batteries at 25° C., plus or minus about 2° C. This will greatly prolong battery life in a reliable and relatively inexpensive manner.

An insulation pad 34 is located beneath the heating pad and minimizes heat transfer to a concrete pad 35 which is typically used to mount equipment cabinets. The insulation pad may be made of high temperature plastic, one-eighth of an inch thick.

The cabinet also encloses a heat exchanger 36 in the equipment chamber 12. The heat exchanger sucks in ambient air 40 by a fan 42 through a set of louvers 44. The used air is then exhausted through a second opening 46 back to the ambient environment.

The air heated by the equipment in chamber 12 is moved through the heat exchanger by a second fan 50. The air enters the heat exchanger through an opening 52 and exits back into the equipment chamber 12 through another opening 54. The air from the equipment chamber 12 and the ambient air never mix even though heat exchange occurs. Moreover, the equipment chamber 12 is weather sealed so that air, dust, water and the like is kept away from the equipment except when the equipment is serviced. The refrigeration system dissipates heat through an opening 56 in the cabinet.

Another important advantage of the present invention is that the ambient air 40 passes through the battery chamber 14 before entering the heat exchanger 36. To the extent the thermal mass (the batteries and cold plate) in the battery chamber is cooled by the cold plate, the ambient air experiences heat exchange in the battery chamber where this air is cooled before it enters the heat exchanger in the equipment chamber. The air entering the heat exchanger in the equipment chamber is at a lower temperature than would normally be the case, and hence, the heat transfer between the equipment air and the ambient air is improved since the temperature gradient between the two is initially greater.

Figure 4:
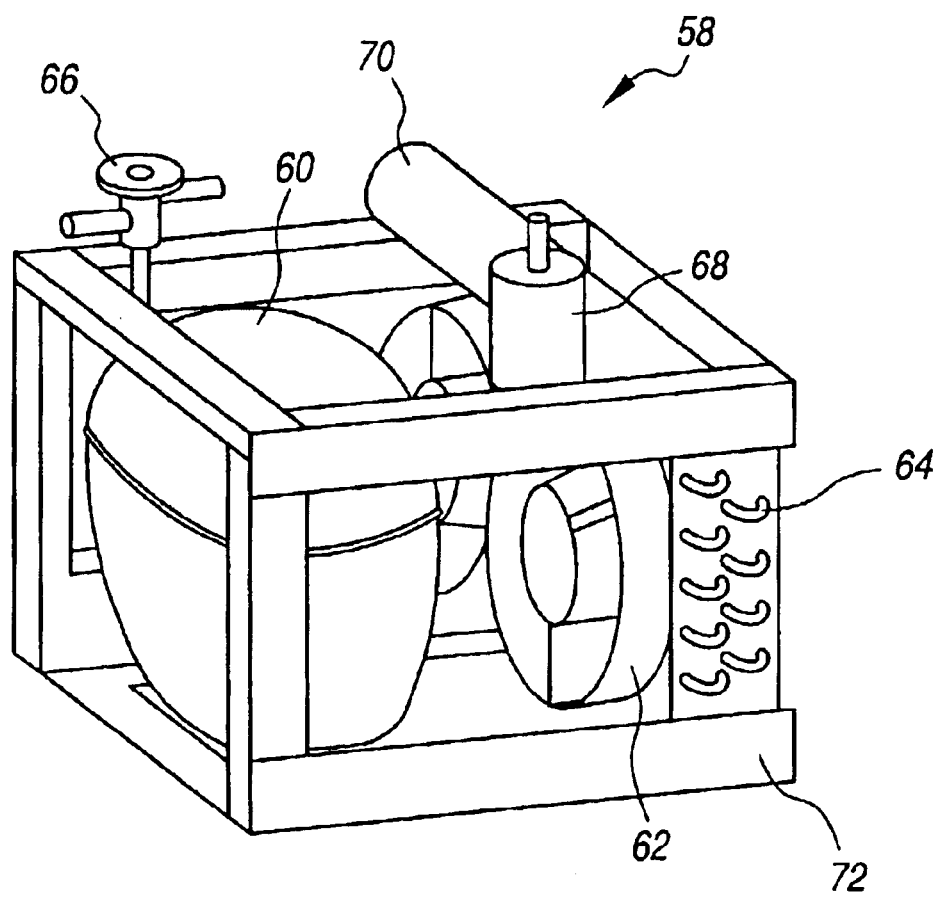
FIG. 4 is an isometric view of the compressor and related apparatus of the present invention.

Referring now to FIG. 4, the compactness of the refrigeration system is shown. This compactness means that existing cabinets do not have to be modified in any major way. A refrigeration system 58 includes a compressor 60, a fan 62, a condenser 64, an expansion valve 66, a filter/dryer 68 and a recuperative heat exchanger 70. These elements are all compactly packaged in a frame 72.

Figure 2:
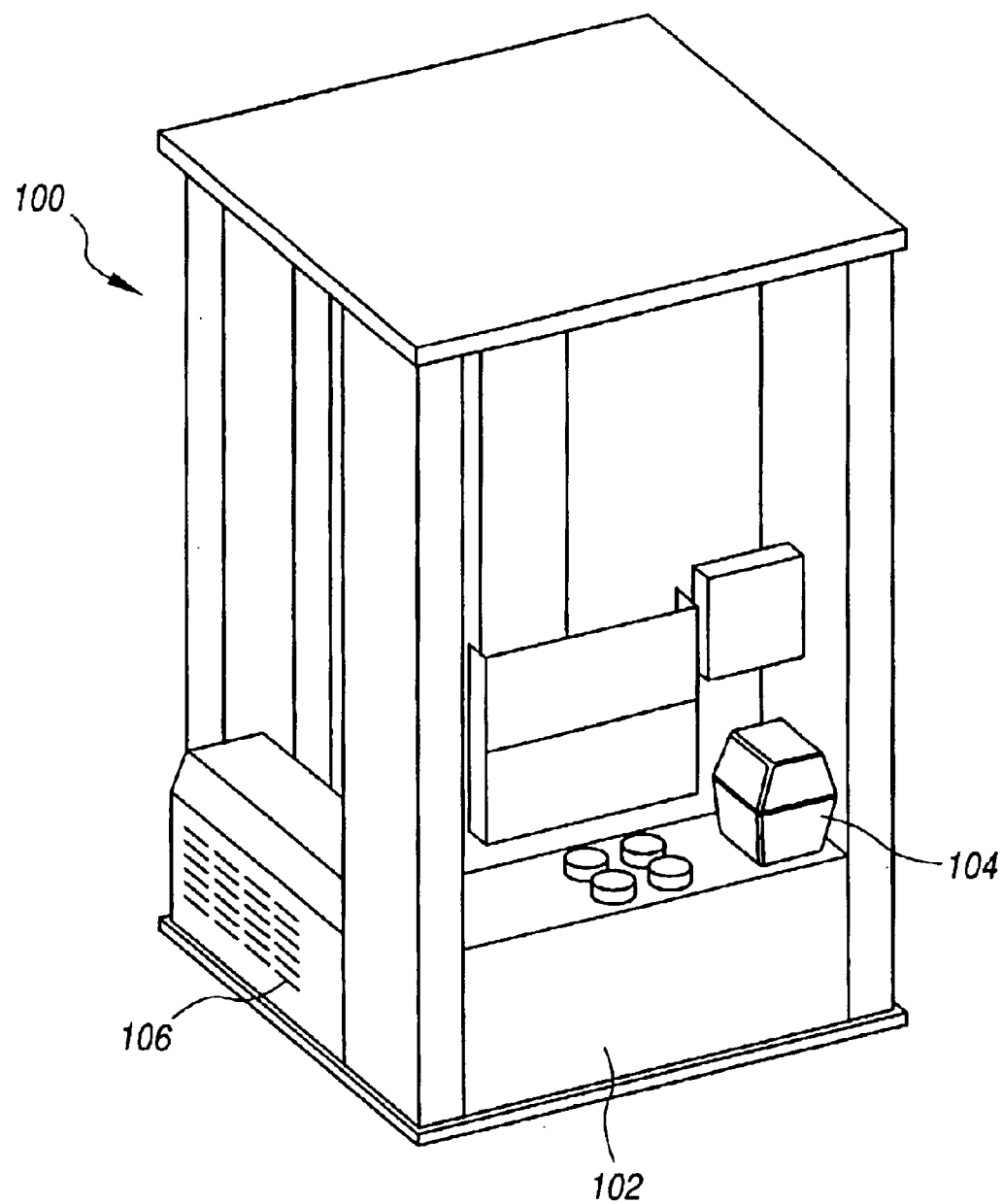
FIG. 2 is an isometric view of an equipment cabinet illustrating one variation of the placement of a refrigeration system and of back-up batteries.
Figure 3:
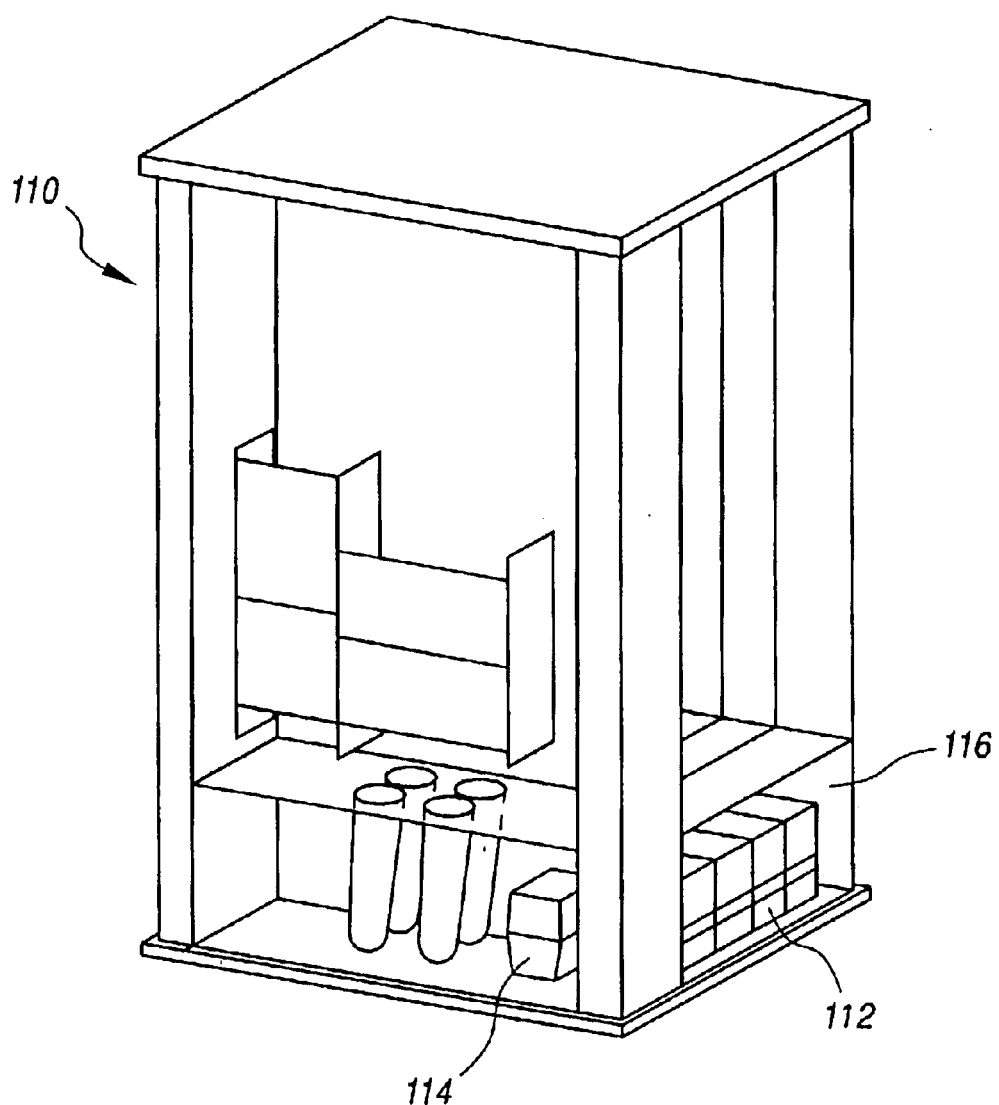
FIG. 3 is an isometric view of an equipment cabinet illustrating another variation of the placement of the refrigeration system and of back-up batteries of the present invention.

Referring now to FIG. 2, a cabinet 100 is shown although it is missing side walls and doors. The batteries are mounted behind a panel 102, just below the refrigeration system 104. Ambient air louvers 106 are shown at the front of the cabinet. FIG. 3 illustrates a cabinet 110 having the batteries 112 and the refrigeration system 114 both located in the battery chamber 116.

Figure 5:
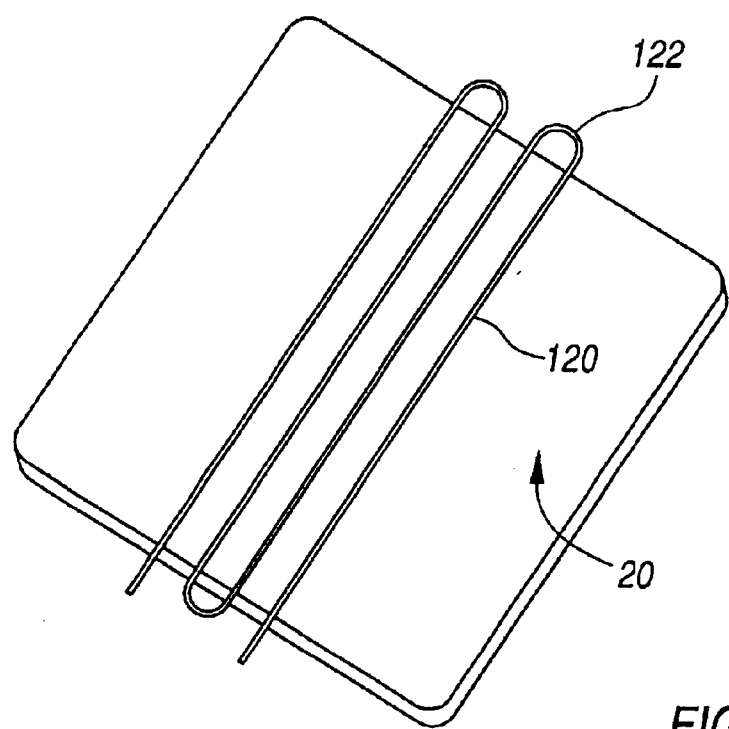
FIG. 5 is a plan view of a cold plate.

Referring now to FIG. 5, the cold plate is illustrated in more detail. The cold plate 20 is a half inch tall plate of aluminum having a serpentine three-eighths of an inch groove 120 for receiving a copper tube 122. The copper tube is about one hundred and twenty inches long and is connected to the compressor 30 so that a refrigerant may be circulated between the cold plate (evaporator) and the compressor. In this way the batteries may be maintained at 25° C. A suitable refrigerant is known as 404A and the compressor has a heat removal capacity of about 500 watts.

The cold plate is a square in plan view having sides of about 20.5 inches. This size assumes four batteries which are disposed on top of the cold plate. The batteries each measure about 20 inches in length and 4.5 to 5 inches in width. The use of the cold plate insures a large surface area for contact between the batteries and the cold source. Such a large contact enhances conductive heat transfer. Thus the system is very efficient.

Figure 6:
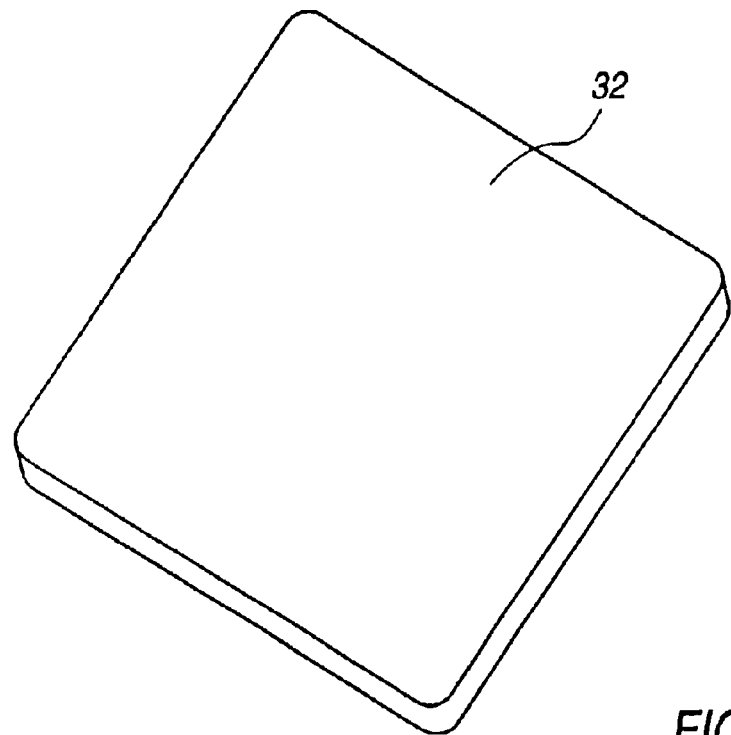
FIG. 6 is a plan view of a heating pad.

Referring now to FIG. 6, the heating pad 32 comprises silicon rubber covers over heating coils. The heating pad uses resistive wire at 120 volts. The heating pad is operated in cold weather to maintain the batteries at about 25° C. In warmer weather the heating pad is not operated. The system may be AC or DC powered.

It can now be appreciated that a system constructed according to the invention offers considerable advantages over prior art systems, and in particular, over forced convection cooling systems, by assuring that the temperature of the batteries is maintained at a near constant predetermined temperature due to their direct contact with the cold plate 20, thereby providing for conductive heat transfer. Preferably, the desired constant temperature is set to about 25° C. which is the recommended temperature for maximizing the life of lead-acid type batteries. That is, rather than exposing the batteries to a wide range of temperatures, even with convection cooling, the present invention maintains an almost constant temperature at the most optimum level in either hot or cold ambient conditions. It has been found that the cold plate should be maintained at about 25° C. below zero for the batteries to be at 25° C. above zero.

In addition to battery life extension, the method and apparatus described is simple, reliable and relatively inexpensive. The apparatus fits within existing cabinet structures and, thus, does not require a cabinet redesign.

The specification describes in detail several embodiments of the present invention. Other modifications and variations will, under the doctrine of equivalents, come within the scope of the appended claims. For example, the exact material of the cold plate may change as may the arrangement of the copper tubing in relation to the cold plate. Moreover, the heating pad structure may also be different as may its material. Further, the location of the compressor may change as may the location of the batteries. All of these and other matters are considered equivalent structures. Still other alternatives will also be equivalent as will many new technologies. There is no desire or intention here to limit in any way the application of the doctrine of equivalents.

What is claimed is:

1. An equipment enclosure containing communication components comprising:
   a cabinet having an upper equipment chamber and a lower back-up battery chamber;
   a plurality of batteries in said battery chamber;
   a generally flat cold plate disposed in thermally conductive contact with said plurality of batteries;
   a refrigeration system mounted in said cabinet and in thermal communication with said cold plate for maintaining said cold plate at a substantially constant predetermined temperature selected to extend the useful life of said plurality of batteries;

a heat exchanger mounted in said cabinet;

an air path formed between an ambient air intake and an air exhaust and through said battery chamber and said heat exchanger, said ambient air flowing through said battery chamber before flowing through said heat exchanger;

a first fan for moving ambient air along said air path; and a second fan for circulating air in said upper chamber through said heat exchanger.

2. The enclosure of claim 1 wherein:

the temperature is maintained at about 25° C.

3. The enclosure of claim 1 including:

a layer of insulation disposed underneath said cold plate, and said cold plate being disposed underneath said plurality of batteries.

4. The enclosure of claim 1 including:

a heating pad disposed underneath said cold plate.

5. The enclosure of claim 4 including:

a layer of insulation disposed underneath said heating pad; and wherein the temperature is maintained at about 25° C.

6. The enclosure of claim 4 wherein:

said refrigeration system is mounted beneath said upper chamber.

7. The enclosure of claim 4 wherein:

said refrigeration system is mounted above said lower chamber.

8. The enclosure of claim 4 wherein:

said refrigeration system includes a packaging frame.

9. The enclosure of claim 4 wherein:

said heating pad is formed of silicon rubber with a heating coil.

10. The enclosure of claim 1 including:

a concrete pad to which said cabinet is mounted.

11. The enclosure of claim 1 wherein:

said cold plate is formed of thermally conductive material and has a serpentine groove for receiving a tube.

12. The enclosure of claim 1 wherein:

said cold plate is formed of thermally conductive material and has a serpentine groove for receiving a tube; and including a heating pad disposed underneath said cold plate, said heating pad being formed of silicon rubber with a heating coil.

13. The enclosure of claim 12 wherein:

said refrigeration system includes a compressor, a fan, a condenser and an expansion valve packaged in a frame.

14. The enclosure of claim 13 including:

a concrete pad to which said cabinet is mounted.

* * * * *